United States Patent [19]

Hallgren et al.

[11] Patent Number: 4,678,839

[45] Date of Patent: Jul. 7, 1987

[54] MIXTURES INCLUDING POLYPHENYLENE ETHERS AND LACTAMS AND RESINOUS COMPOSITIONS PREPARED THEREFROM

[75] Inventors: John E. Hallgren, Scotia; Peter P. Policastro, Schenectady; Herbert S. Chao, Watervliet; Bruce C. Johnson, Burnt Hills, all of N.Y.

[73] Assignee: General Electric Company, Schenectady, N.Y.

[21] Appl. No.: 752,744

[22] Filed: Jul. 8, 1985

[51] Int. Cl.[4] .............................................. C08L 71/04
[52] U.S. Cl. .................................. 525/390; 525/397; 528/125; 528/211
[58] Field of Search ................ 525/390, 397; 528/125, 528/211

[56] References Cited

U.S. PATENT DOCUMENTS

Re. 30,322  7/1981  Hammer et al. .
Re. 30,754  9/1981  Hammer et al. .
3,657,385  4/1972  Matzner et al. .
3,723,566  3/1973  Thompson et al. .
3,729,527  4/1973  Nield .
3,862,262  1/1975  Hendrick et al. .
3,944,629  3/1976  Hendrick et al. .
3,975,463  8/1976  Hirata et al. .

OTHER PUBLICATIONS

Hammett, Physical Organic Chemistry (New York: McGraw-Hill Book Co., Inc., 1940), p. 188.

*Primary Examiner*—Joseph L. Schofer
*Assistant Examiner*—Bernard Lipman
*Attorney, Agent, or Firm*—William H. Pittman; James C. Davis, Jr.; James Magee, Jr.

[57] ABSTRACT

Mixtures of polyphenylene ethers, lactams such as $\epsilon$-caprolactam and lactam polymerization catalysts, preferably basic reagents, may be polymerized. There is preferably also present a lactam polymerization promoter, especially a functionalized polyphenylene ether. Polymerization produces resinous compositions including phenylene etheramide copolymers, especially block and/or graft copolymers. Said resinous compositions may be molded into articles having a number of advantageous properties.

23 Claims, 19 Drawing Figures

(I) 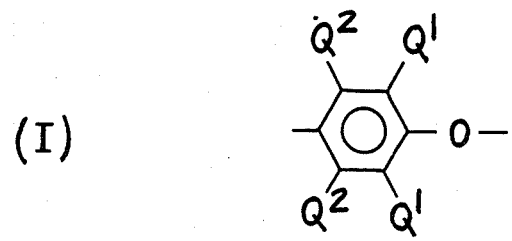
(II) 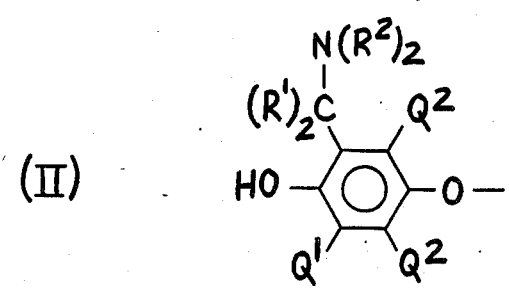
(III) 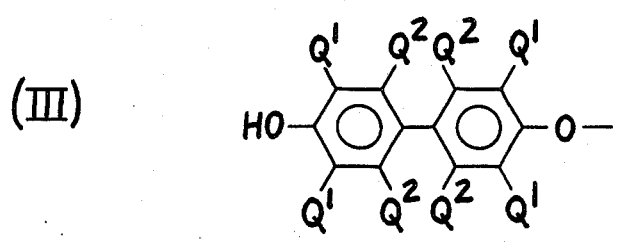
(IV) 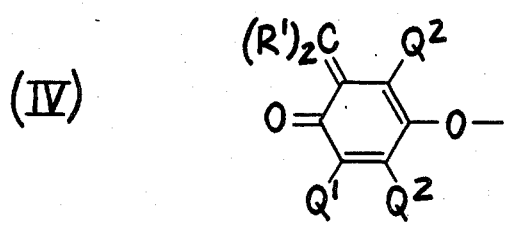
(V) 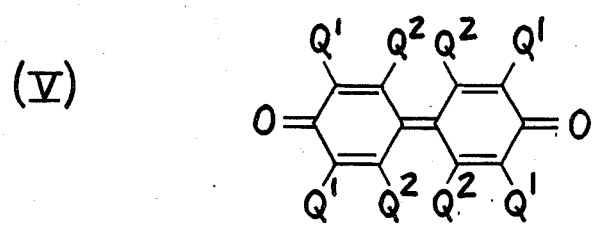

(VI) 
(VII) 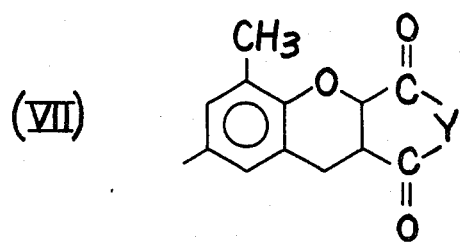
(VIII) 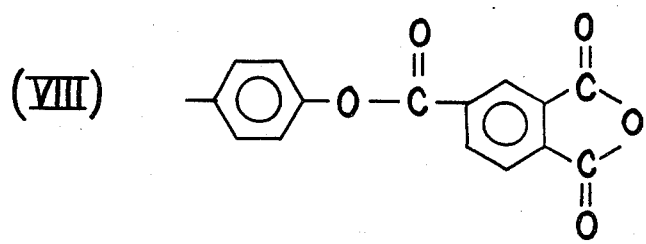
(IX) 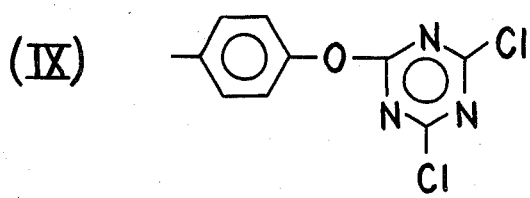
(X) 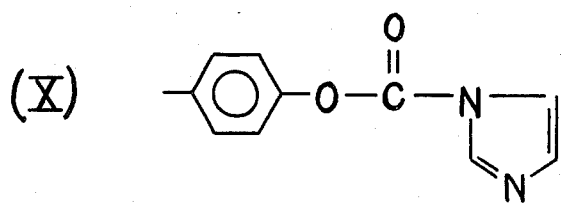

(XI) 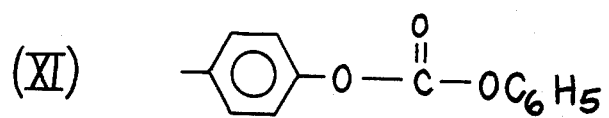
(XII) 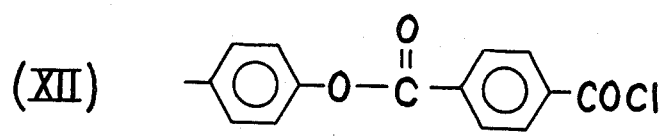
(XIII) 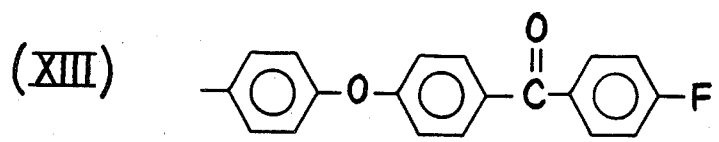
(XIV) 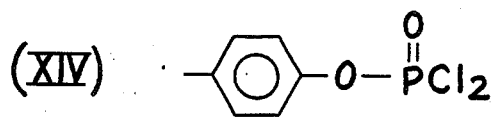
(XV) 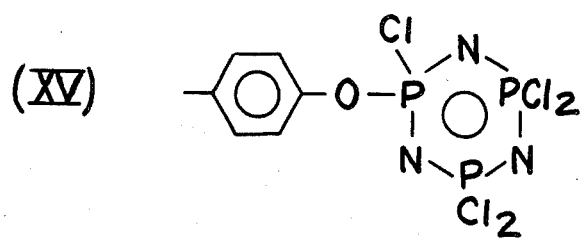

(XVI) 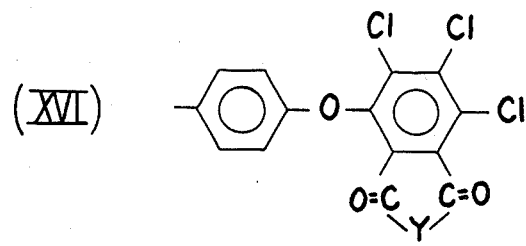
(XVII) 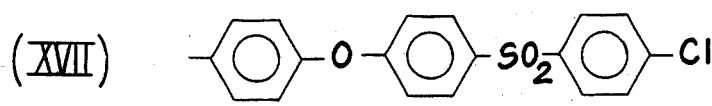
(XVIII) 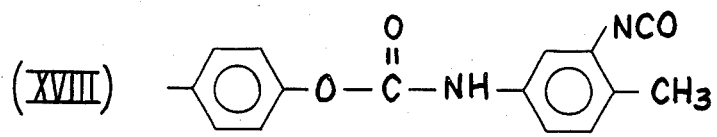
(XIX) 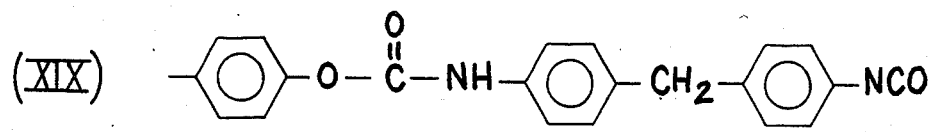

MIXTURES INCLUDING POLYPHENYLENE ETHERS AND LACTAMS AND RESINOUS COMPOSITIONS PREPARED THEREFROM

This invention relates to new polyphenylene ether compositions of matter and methods for their preparation and use.

Polyphenylene ethers (also known as polyphenylene oxides) are a known class of resinous materials useful in engineering resins for high performance applications. For the most part, they are blended with other resins such as polystyrenes or polyamides and molded to produce articles having advantageous properties such as high impact strength and thermal stability.

Because of the excellent properties imparted by polyphenylene ethers to the blends in which they are incorporated, they are under consideration for still wider varieties of use such as in automotive body parts. Such uses require even stricter standards of structural integrity and chemical resistance.

A principal object of the present invention, therefore, is to produce new polyphenylene ether-containing resinous compositions which may be formed into articles having advantageous properties.

A further object is to provide methods for preparing such resinous compositions and intermediates useful in said methods.

Other objects will in part be obvious and will in part appear hereinafter.

In one of its aspects, the present invention is directed to polymerizable compositions comprising a mixture of at least one lactam, at least one polyphenylene ether resin and a lactam polymerization catalyst. Other aspects of the invention include methods for converting such compositions to resinous materials, the materials thus obtained and molded articles prepared therefrom.

The polyphenylene ethers (also known as polyphenylene oxides) used in the present invention are a well known class of polymers widely used in industry as a result of the discovery by Allan S. Hay of an efficient and economical method of preparation. Since their discovery, they have given rise to numerous variations and modifications but still may, as a class, be generally characterized by the presence of aryleneoxy structural units. The present invention includes all of said variations and modifications, including but not limited to those described hereinafter.

The polyphenylene ethers generally comprise structural units having formula I in the drawings. In each of said units independently, each $Q^1$ is independently hydrogen, halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Suitable polyphenylene ethers are disclosed in a large number of patents. The following are illustrative but not limiting:

| | | | |
|---|---|---|---|
| 3,226,361 | 3,330,806 | 3,929,930 | 4,234,706 |
| 3,234,183 | 3,390,125 | 4,028,341 | 4,334,050 |
| 3,257,357 | 3,431,238 | 4,054,533 | 4,340,696 |
| 3,257,358 | 3,432,466 | 4,092,294 | 4,345,050 |
| 3,262,892 | 3,546,174 | 4,097,556 | 4,345,051 |
| 3,262,911 | 3,700,630 | 4,140,675 | 4,374,959 |
| 3,268,478 | 3,703,564 | 4,158,728 | 4,377,662 |
| 3,306,874 | 3,733,307 | 4,207,406 | 4,477,649 |
| 3,306,875 | 3,875,256 | 4,221,881 | 4,477,651 |
| 3,318,959 | 3,914,266 | 4,226,951 | 4,482,697 |
| | | | 4,517,341. |

Both homopolymers and copolymers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in various Hay patents. Also contemplated are graft copolymers, including those prepared by grafting onto the polyphenylene ether chain such vinyl monomers as acrylonitrile and vinylaromatic compounds (e.g., styrene), and polymers such as polystyrenes and elastomers. Other suitable polymers are the coupled polyphenylene ethers in which the coupling agent is reacted with the hydroxy groups of two polyphenylene ether chains to increase the molecular weight of the polymer. Illustrative coupling agents are low molecular weight polycarbonates, quinones, heterocycles and formals.

The polyphenylene ether generally has a weight average molecular weight in the range of about 10,000–75,000 and number average molecular weight, as determined by gel permeation chromatography within the range of about 5,000–40,000; its intrinsic viscosity is most often in the range of about 0.45–0.5 dl./g., as measured in chloroform at 25° C.

The polyphenylene ethers may be prepared by known methods, typically by the oxidative coupling of at least one corresponding monohydroxyaromatic compound. A particularly useful and readily available monohydroxyaromatic compound is 2,6-xylenol (wherein each $Q^1$ is methyl and each $Q^2$ is hydrogen), whereupon the polymer may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound such as a copper, manganese or cobalt compound, usually in combination with various other materials.

A first class of preferred catalyst systems consist of those containing copper Such catalysts are disclosed, for example, in the aforementioned U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Manganese-containing systems constitute a second preferred class of catalysts. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric) o-hydroxyaryl oximes and β-diketones. Also useful are cobalt-containing catalyst systems.

The following additional patents disclose manganese and cobalt-containing catalyst systems for polyphenylene ether preparation:

| | | |
|---|---|---|
| 3,956,242 | 4,083,828 | 4,184,034 |
| 3,962,181 | 4,093,596 | 4,315,086 |
| 3,965,069 | 4,093,597 | 4,335,233 |
| 3,972,851 | 4,093,598 | 4,385,168. |
| 4,058,504 | 4,102,865 | |
| 4,075,174 | 4,110,312 | |

Particularly useful polyphenylene ethers for the purposes of this invention are those which comprise molecules having at least one of the end groups of formulas II and III, wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radical. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of formula IV, with numerous beneficial effects often including an increase in impact strength and compatibilization with other blend components. Reference is made to the aforementioned U.S. Pat. Nos. 4,054,553, 4,092,294, 4,477,651 and 4,517,341.

Polymers with biphenol end groups of formula III are typically obtained from reaction mixtures in which a by-product diphenoquinone of formula V is present, especially in a copper-halide-secondary or tertiary amine system. In this regard, the disclosures of the aforementioned U.S. Pat. Nos. 4,234,706, 4,477,649 and 4,482,697 are particularly pertinent. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. Such molecules are particularly suitable in the present invention because of their capability of reacting to form functionalized species as described hereinafter. It should be understood, however, that other end groups may be present and that the invention in its broadest sense is not dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features. To insure completeness of disclosure and to facilitate an understanding of the scope of the present invention, the relevant disclosures of all of the patents listed hereinabove are incorporated by reference herein.

Various known lactams may be used. They include those having formula VI, in which $R^3$ is an alkylene radical which includes a straight chain containing about 2-12 preferably about 4-12 carbon atoms. Illustrative lactams are pivalolactam, δ-valerolactam, ε-caprolactam and laurolactam, in which $R^3$ is $C(CH_3)_2CH_2$, $(CH_2)_4$, $(CH_2)_5$ and $(CH_2)_{11}$ respectively. ε-Caprolactam and laurolactam are especially preferred.

The third component of the polymerizable mixtures of this invention is a lactam polymerization catalyst. For this purpose, any known catalysts for lactam polymerization may be employed. These include water, protonic and Lewis acids such as phosphoric acid and zinc chloride, and basic reagents.

The basic reagents are preferred. They may be inorganic bases such as the alkali and alkaline earth metals and their hydrides, hydroxides, carbonates and alkoxides, and strong organic bases such as tetraalkylammonium hydroxides, guanidines, and organometallics including Grignard reagents and organolithium reagents. Bases of this type react with lactams under certain conditions by displacing the hydrogen atom attached to nitrogen. It is also contemplated, therefore, to employ preformed lactam salts in the mixtures of this invention. The preferred basic reagents are the alkali metal (especially sodium) hydrides and the lactam salts of alkali and alkaline earth metals.

The relative proportions of polyphenylene ether, lactam and basic reagent in the mixtures of this invention are largely dependent on the intended properties and end uses of the polymerized product. Such mixtures may generally contain about 10–97% polyphenylene ether by weight (including any functionalized polyphenylene ether as described hereinafter), based on polyphenylene ether and lactam. The amount of basic reagent is ordinarily about 1–100 milliequivalents per mole of lactam.

Conventional blending techniques may be used to prepare the mixtures of this invention. Examples of such techniques are dissolution of the polyphenylene ether in the lactam, dry blending of the two followed by heating until homogeneous (e.g., in extrusion equipment), and dissolution in a solvent for both, optionally followed by removal of said solvent by evaporation. The lactam polymerization catalyst is usually added last, typically just before polymerization.

The lactam constituents of the blend compositions of this invention may be polymerized. There are thus produced resinous compositions which, together with the method for their preparation, are other aspects of the invention. Polymerization is generally effected under art-recognized lactam polymerization conditions. Thus, water- and acid-catalyzed polymerization is typically conducted at temperatures in the range of about 225°–275° C., frequently under autogenous or higher pressure. When the preferred basic catalysts are employed, anionic polymerization is typically effected at temperatures in the range of about 80°–250° C.

It is frequently possible to employ lower polymerization temperatures (especially when basic catalyst are used), typically up to about 200° C and preferably about 90°–150° C., when there is also present in the mixture a lactam polymerization promoter. The useful promoters include compounds which react with lactams to form molecular species having less basic leaving groups under anionic polymerization conditions than the amide ion formed by ring-opening of the lactam. They also include the reaction products of lactams with such compounds. Promoters of this type are known in the art and include the following:

Functional derivatives of organic acids, including carboxylic, thiocarboxylic, phosphoric, thiophosphoric, sulfinic, sulfonic and cyanuric acids. Preferred functional derivatives are the halides, anhydrides, phenyl esters and amides containing electron-deficient heterocyclic moieties such as imidazole, triazole or succinimide.

Compounds in which atoms of at least two different elements are linked with cumulated double bonds. These include ketenes, carbodiimides, isocyanates and isothiocyanates.

Aromatic compounds containing a plurality of highly electron-withdrawing substituents, examples of which are nitro, keto, sulfone, nitrile and phosphine oxide.

Silyllactams of the type disclosed in U.S. Pat. No. 4,038,470, the disclosure of which is incorporated by reference herein.

The disclosure of U.S. Pat. No. 3,723,566 is also incorporated by reference herein for its teachings of lactam polymerization promoter species.

In one embodiment of the invention, the lactam polymerization promoter is a separate compound such as phenyl isocyanate, acetyl chloride, benzoyl chloride, phthalic anhydride, diphenylphosphinyl chloride, diphenylketene or benzenesulfonyl chloride, or a lactam reaction product therewith. A preferred embodiment of the invention, however, involves the use as a lactam polymerization promoter of a functionalized polyphenylene ether.

The functional groups on said functionalized polyphenylene ethers are of the same types as those on the above-listed separate lactam polymerization promoters. They are typically introduced into the polyphenylene ether molecule by means of a hydroxyaromatic-reactive reagent; that is, one which will react with the hydroxy end group on the polymer chain. Such hydroxyaromatic-reactive reagents may react with the end groups of formula III to form stable molecules; with the end groups of formula II, typically regenerating the quinone methide-type intermediate of formula IV as the reactive species; with both; or elsewhere in the polymer molecule. Examples of the quinone methide-type of reaction may be encountered in varying proportions with maleic anhydride and maleimides. They may undergo an addition reaction of the Diels-Alder type with the quinone methide-type intermediate to produce an end group such as that represented by formula VII, wherein Y is as defined hereinafter; or they may add to the methyl groups to produce a substituted succinic anhydride or succinimide.

Other exemplary functionalized polyphenylene ethers are prepared by reacting polyphenylene ethers with the reagents listed in the following table, under conventional conditions for the reaction of such reagents with hydroxyaromatic compounds. Formulas VIII–XIX represent illustrative terminal lactam polymerization promoter moieties which may be produced on either end or both ends of the polyphenylene ether chain by said reactions. In formulas VII and XVI, the Y value is typically O or N—$R^6$, wherein $R^6$ may be, for example, hydrogen, a $C_{1-4}$ alkyl radical or a $C_{6-13}$ aromatic hydrocarbon radical. The ortho substituents are omitted from formulas VIII–XIX for the sake of simplicity.

| Formula | Reagent |
| --- | --- |
| VIII | Trimellitic anhydride acid chloride |
| IX | Cyanuric chloride |
| X | N,N'—Carbonyldiimidazole |
| XI | Phenyl chloroformate |
| XII | Terephthaloyl chloride |
| XIII | 4,4'-Difluorobenzophenone |
| XIV | Phosphorus oxychloride |
| XV | Phosphonitrilic chloride trimer |
| XVI | Tetrachlorophthalic anhydride or tetrachlorophthalimides |
| XVII | Bis(4-chlorophenyl) sulfone |
| XVIII | Toluene diisocyanate |
| XIX | Methylene-bis(4-phenyl isocyanate) |

Depending on the nature and proportions of the lactam polymerization promoter, the constituents of the resinous compositions of this invention may be polyphenylene ether-polyamide blends and/or phenylene ether-amide copolymers. The properties of said compositions are in large part dependent on the proportion of such copolymers therein. It is frequently, though not necessarily always, beneficial to maximize the copolymer proportion in order to promote uniformity and dispersibility of any polyphenylene ether phase (whether originally present or added separately) in the polyamide phase. The results often include increased impact strength, elongation and the like.

It may also be desirable on occasion to isolate the copolymer for separate use, typically by selectively dissolving the polyphenylene ether and polyamide homopolymers and any unpolymerized lactam. This may be conveniently effected by first removing polyphenylene ether homopolymer and unreacted lactam by dissolution in chloroform, and subsequently dissolving polyamide homopolymer in formic acid. The residue which is insoluble in both chloroform and formic acid is phenylene ether-amide copolymer. Compositions consisting essentially of copolymers prepared as described hereinabove are therefore another aspect of the invention.

Under essentially all polymerization conditions, the resinous composition contains at least a small proportion of phenylene ether-amide copolymer. As a general rule, however, the copolymer proportion varies directly with the proportion of functionalized polyphenylene ether in the mixture to be polymerized.

Whether it is a functionalized polyphenylene ether or a separate compound, the amount of promoter used is most often about 0.1–10 mole percent of the lactam-promoter combination. When a functionalized polyphenylene ether is used, said amount is approximately the mole percent of the hydroxyaromatic-reactive reagent with respect to the total amount of said reagent and the lactam.

Such copolymers most often comprise phenylene ether-amide block and/or graft copolymers. Upon thermal analysis of the copolymer, two melting points are generally detected, which indicates the presence of two chemically linked molecular species. The percentage of each species may be determined by elemental analysis for carbon and nitrogen.

The invention is illustrated by the following examples. All parts and percentages are by weight unless otherwise indicated. In each example, a polyphenylene ether prepared by oxidative coupling of 2,6-xylenol in the presence of a copper-bromide-amine catalyst including di-n-butylamine, and having a number average molecular weight of about 20,000, was used.

EXAMPLE 1

A mixture of 10 grams of polyphenylene ether and 7 grams of $\epsilon$-caprolactam was heated to 150° C., with stirring, until dissolution of the polyphenylene ether was complete. Sodium hydride, 200 mg (8.3 mmol.), was added and stirring was continued until hydrogen evolution had ceased. The temperature was maintained at 150° C. as a solution of 100 microliters (0.92 mmol ) of phenyl isocyanate in 3 grams of $\epsilon$-caprolactam (total 88 mmol.) was added. The reaction mixture became extremely viscous and solidified within one minute. It was cooled to room temperature, yielding a tough polymeric material which was shown by selective extraction with chloroform and formic acid to contain about 1% phenylene ether-amide copolymer.

EXAMPLE 2

A mixture of 25 parts of polyphenylene ether, 100 parts of $\epsilon$-caprolactam, 2 parts of 85% phosphporic acid and 1.25 parts of water was heated for 16 hours at 240°-250° C., in a nitrogen atmosphere. The viscous product was poured into a pan and allowed to cool. The resinous product was found to contain about 1.3% of phenylene ether-amide copolymer.

EXAMPLE 3

A mixture of 25 parts of polyphenylene ether, 85 parts of $\epsilon$-caprolactam, 15 parts of laurolactam and 4 parts of water is heated for several hours under nitrogen in a sealed tube at 270° C. The tube is then cooled and opened and the resinous product, containing small amounts of a phenylene ether-lactam copolymer including structural units derived from both lactams, is recovered.

EXAMPLE 4

A solution of 40 grams of polyphenylene ether in 150 ml. of toluene was heated to 80° C. and 0.24 gram of a 60% dispersion of sodium hydride in oil (6 mmol.) was added. The solution was heated under reflux until hydrogen evolution had ceased, whereupon 1.11 grams (3 mmol.) of cyanuric chloride was added and the mixture was heated under reflux for about 15 hours. The functionalized polyphenylene ether was precipitated with acetonitrile, filtered, washed with acetonitrile and dried in a vacuum oven. The nitrogen content of the functionalized resin was 0.47%, compared to 0.13% for unmodified polyphenylene ether. This corresponds to a functionalization proportion of about 80% of theoretical.

A mixture of 20 grams of the functionalized polyphenylene phenylene ether and 70 grams of $\epsilon$-caprolactam was heated to 180° under nitrogen, with stirring, until complete dissolution of the polyphenylene ether occurred. A mixture of 1 gram of a 60% sodium hydride dispersion in oil (25 mmol.) and 10 grams of $\epsilon$-caprolactam (total 708 mmol.), heated to 130° C., was added to the solution of the modified polyphenylene ether, which became very viscous in less than one minute and subsequently solidified.

The solid mass was cut into small pieces which were compression molded into thin films. The films were extracted with chloroform in a Soxhlet extractor for 24 hours to remove polyphenylene ether and unpolymerized caprolactam. The residue was stirred in formic acid for 24 hours at room temperature to dissolve unreacted polyamide. The undissolved material, which was a block phenylene etheramide copolymer, comprised 30% of the total polymeric composition. Thermal analysis showed the presence of two melting points, 219° C. and 267° C. Elemental analysis showed the presence of 68 mole percent polyamide and 32 mole percent polyphenylene ether.

EXAMPLE 5

A mixture of 20 grams of polyphenylene ether and 70 grams of $\epsilon$-caprolactam was heated to 180° C. as in Example 4, until it became homogeneous. A suspension of sodium hydride in caprolactam was added as in Example 4 and the mixture was stirred for 20 minutes; no polymerization was observed. Phthalic anhydride, 0.5 gram, was then added and the reaction mixture became a solid mass in one minute. Upon compression molding, dissolution and analysis as described in Example 4, an amount of copolymer corresponding to 1% of the total polymer mass was recovered.

EXAMPLE 6

A mixture of 12.5 parts of the functionalized polyphenylene ether of Example 4 and 8.5 parts of $\epsilon$-caprolactam was heated in a Brabender mixer at 130°-140° C., with stirring, until homogeneous. There was then added 4 parts of a mixture of $\epsilon$-caprolactam (total 103 mmol.) and the magnesium bromide salt of said caprolactam, comprising about 4.1 mole percent (4.24 mmol.) of the magnesium salt. The mixture was heated to 220° C. over 5-10 minutes, with stirring, whereupon polymerization occurred and the mixture solidified. It was found to contain 46% of the phenylene ether-polyamide copolymer.

A portion of the mixture was injection molded into notched Izod test strips. A second portion was blended with a commercially available A-B-A block copolymer in which the A blocks were polystyrene and the B block was ethylenebutylene, said block copolymer comprising 10% of the blend. The two compositions were subjected to physical testing by ASTM methods, with the following results.

| Test | Polyphenylene ether-polyamide composition | Blend |
| --- | --- | --- |
| Elongation at break, % | 196 | 289 |
| Tensile modulus, psi. | 151,508 | 99,026 |
| Strength at break, psi. | 9,123 | 8,557 |
| Strength at yield, psi. | 11,417 | 5,803 |
| Notched Izod impact strength, ft.-lbs./in. | 0.52 | 13.35 |

EXAMPLE 7

A mixture of 200 grams of polyphenylene ether and 800 grams of toluene was heated at 75° C. until homogeneous. N-N'-Carbonyldiimidazole, 8.1 grams (3.125 mmol), was then added and the solution was heated under reflux for 5 hours. It was then cooled to room temperature and an additional 500 ml. of toluene was added, after which the functionalized polyphenylene ether was precipitated from 5 liters of acetonitrile, washed with acetonitrile, filtered and dried in a vacuum oven.

Following the procedure of Example 6, a resinous composition was prepared from the functionalized polyphenylene ene ether and ϵ-caprolactam and was found to contain 26% phenylene ether-polyamide copolymer.

EXAMPLE 8

A solution of 200 grams of polyphenylene ether in 800 grams of toluene was prepared as in Example 7, and 7.83 grams (3.125 mmol.) of phenyl chloroformate was added followed by 6.0 grams (59.4 mmol.) of triethylamine. The mixture was heated under reflux for 5 hours, cooled and diluted with 500 ml. of toluene. The functionalized polyphenylene ether was precipitated by pouring into 5 liters of acetonitrile, washed with acetonitrile, filtered and dried in a vacuum oven.

Following the procedure of Example 6, a resinous composition was prepared from the functionalized polyphenylene ether and ϵ-caprolactam and was found to contain 33% phenylene ether-polyamide copolymer.

EXAMPLE 9

To a solution of 50 grams of polyphenylene ether in 200 grams of toluene was incrementally added 0.4 gram (10 mmol.) of a 60% sodium hydride dispersion in mineral oil. After hydrogen evolution had ceased, 2.03 grams (2.5 mmol.) of terephthaloyl chloride was added. The mixture was heated under reflux for about 15 hours, cooled and diluted with 200 grams of toluene. The functionalized polyphenylene ether was then precipitated by pouring into one liter of acetonitrile, washed with acetonitrile, filtered and dried in a vacuum oven.

Following the procedure of Example 6, a resinous composition was prepared from the functionalized polyphenylene ether and ϵ-caprolactam and was found to contain 34% phenylene ether-amide copolymer.

EXAMPLE 10

To a solution of 50 grams of polyphenylene ether in 200 grams of toluene was added 4.21 grams (5 mmol.) of trimellitic anhydride acid chloride, followed by 4.05 grams (4 mmol.) of triethylamine. The reaction mixture was maintained at 80° C. for about 15 hours, cooled, diluted with toluene, precipitated from acetonitrile and isolated as described in Example 5.

Following the procedure of Example 6, a resinous composition was prepared from the functionalized polyphenylene ether and ϵ-caprolactam and was found to contain 14% phenylene ether-amide copolymer.

EXAMPLE 11

A mixture of 40 parts of polyphenylene ether and 140 parts (1.24 moles) of ϵ-caprolactam was heated to 180° C., with stirring, until homogeneous. There was then added 1.12 part of a 60% sodium hydride dispersion in mineral oil. The mixture was stirred for about 15 minutes and 0.58 part (2.6 mmol.) of 4,4'-difluorobenzophenone was added. After 30 minutes, an additional 0.92 part (total 51 mmol.) of sodium hydride dispersion was added and the mixture was heated to 220° C. for 20 minutes, whereupon solidification occurred. The resinous composition thus obtained was found to contain 25% phenylene ether-amide copolymer.

EXAMPLE 12

A mixture of 1,812 parts of polyphenylene ether, 1,087 parts (9.62 moles) of ϵ-caprolactam and 165 parts (660 mmol.) of methylene-bis(4-phenyl isocyanate) was blended for 30 seconds at 2,000 rpm in a Henschel mixer. It was then pre-extruded through a twin-screw extruder at 121°–158° C., at the rate of 4500 parts per hour. The resulting solid strands of blend composition were allowed to cool under essentially anhydrous conditions by passing across a table and were pelletized.

The blend was liquefied by extruding at 3600 parts per hour in a single-screw extruder having three heating zones set at temperatures from 150° to 200° C., and polymerized by feeding directly to a twin-screw extruder having six heating zones set at temperatures from 220° C. to 320° C. As it passed into the second zone of the second extruder, the mixture was combined with the sodium salt of ϵ-caprolactam which was added at 900 parts per hour, corresponding to about 0.5–5.5% by weight based on caprolactam.

The polymerized extrudate was cooled by passing through a water bath and pelletized. Samples of the pelletized material were found to contain between 10% and 30% phenylene ether-amide copolymer. The following physical properties are illustrative:

| | |
|---|---|
| Strength at yield | 10,000 psi. |
| Modulus | 150,000 psi. |
| Elongation at break | 120%. |

The resinous compositions of this invention are characterized by high thermal stability and other advantageous properties characteristic of polyphenylene ethers, as well as the high solvent resistance and other properties attributable to the crystalline nature of the polyamide constituent.

It is within the scope of the invention to combine the polyphenylene ether-lactam-catalyst mixtures, or the resinous compositions prepared by polymerization thereof, with other materials. Examples of such materials are polystyrenes, including styrene homopolymers, random styrene copolymers, block copolymers of styrene with dienes or with other olefins or olefin mixtures, and rubber-modified polystyrenes such as high impact polystyrene. Said polystyrenes are miscible with polyphenylene ethers in all proportions, and the amounts thereof in the mixture may vary accordingly. Further examples are other polyamides such as nylon-6,6 and others known in the art, elastomers such as diene rubbers, ethylene-propylene rubbers, ethylene-propylene-diene rubbers (EPDM's), butyl rubbers and silicone elastomers, and the lactam polymerization promoters described hereinabove.

Easily flowable blend compositions comprising polyphenylene ethers and minor amounts, typically about 3–20% by weight, of lactam may be prepared which are solid at room temperature and have low melt viscosities at molding temperatures. The blend compositions of this invention may also be used in casting and reaction injection molding procedures. This is typically accomplished by formulating one component comprising, for example, polyphenylene ether, lactam and basic catalyst, and another component comprising polyphenylene ether, lactam and promoter (which may be in the form of functionalized polyphenylene ether), and blending the two just before charging to the mold or actually in the mold, under polymerization conditions. One-component systems may also be formulated; for example, incorporation of a weak base may produce systems which cure upon heating.

As indicated by Example 6, molded articles having extremely high impact strengths can be produced from blends of the resinous compositions of this invention with elastomeric materials such as the polystyrenes previously mentioned.

The copolymer compositions of this invention may be used as compatibilizers to optimize homogeneity and dispersibility in blends of polyphenylene ethers with other polymers, especially polyamides such as nylon-6 and nylon-6,6. Other applications of the compositions of this invention will be apparent to those skilled in the art upon reading the description herein.

What is claimed is:

1. A polymerizable composition comprising a mixture of:
   at least one lactam;
   at least one polyphenylene ether resin consisting essentially of structural units having the formula

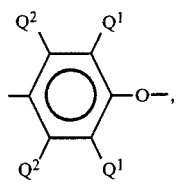

wherein in each of said units independently, each $Q^1$ is independently hydrogen, halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$; and grafted and coupled derivatives thereof; and
   a lactam polymerization catalyst.

2. A composition according to claim 1 wherein the lactam has the formula

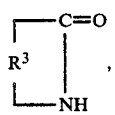

wherein $R^3$ is an alkylene radical which includes a straight chain containing about 4–12 carbon atoms.

3. A composition according to claim 2 wherein the lactam polymerization catalyst is a basic reagent.

4. A composition according to claim 3 which contains about 10–97% polyphenylene ether resin by weight based on polyphenylene ether and lactam, and wherein the polyphenylene ether is a poly(2,6-dimethyl-1,4-phenylene) ether having a weight average molecular weight within the range of about 10,000–75,000.

5. A composition according to claim 4 wherein the polyphenylene ether resin comprises end groups having at least one of the formulas

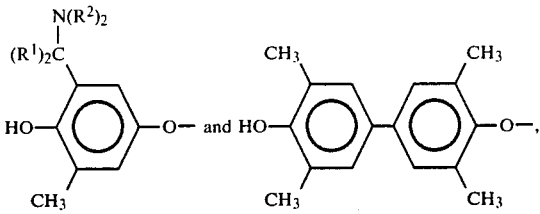

wherein each $R^1$ is hydrogen and each $R^2$ is n-butyl or methyl.

6. A composition according to claim 4 wherein the lactam is ε-caprolactam and the basic reagent is an alkali metal hydride or a lactam salt of an alkali or alkaline earth metal.

7. A composition according to claim 4 which also contains a lactam polymerization promoter.

8. A composition according to claim 7 wherein the lactam polymerization promoter is selected from the group consisting of functional derivatives of organic acids, compounds in which atoms of at least two different elements are linked with double bonds, aromatic compounds containing a plurality of highly electron-withdrawing substituents, and silyllactams.

9. A composition according to claim 7 wherein the lactam polymerization promoter is a functionalized polyphenylene ether.

10. A composition according to claim 9 wherein the polyphenylene ether resin comprises end groups having at least one of the formulas

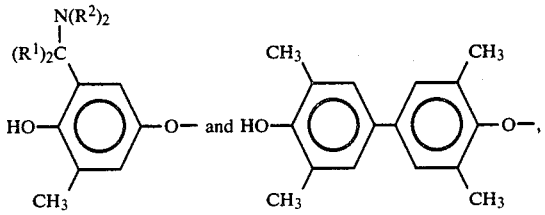

wherein each $R^1$ is hydrogen and each $R^2$ is n-butyl or methyl.

11. A composition according to claim 10 wherein the lactam is ε-caprolactam and the basic reagent is an alkali metal hydride or a lactam salt of an alkali or alkaline earth metal.

12. A method for preparing a resinous composition which comprises heating a blend composition according to claim 1 under polymerization conditions.

13. A method for preparing a resinous composition which comprises heating a blend composition according to claim 5 at a temperature in the range of about 80°–250° C.

14. A method for preparing a resinous composition which comprises heating a blend composition according to claim 10 at a temperature in the range of about 80°–250° C.

15. A resinous composition prepared by the method of claim 12.

16. A resinous composition prepared by the method of claim 13.

17. A resinous composition prepared by the method of claim 14.

18. A molded article comprising a resinous composition according to claim 15.

19. A molded article comprising a resinous composition according to claim 16.

20. A molded article comprising a resinous composition according to claim 17.

21. A composition consisting essentially of phenylene ether-amide copolymers prepared by the method of claim 12.

22. A composition consisting essentially of phenylene ether-amide copolymers prepared by the method of claim 13.

23. A composition consisting essentially of phenylene ether-amide copolymers prepared by the method of claim 14.

* * * * *